United States Patent [19]
Hillestad

[11] Patent Number: 5,179,799
[45] Date of Patent: Jan. 19, 1993

[54] DEMOUNTABLE TOMATO PLANT SUPPORT

[76] Inventor: Jerome Hillestad, 26350 Fallbrook Ave., Wyoming, Minn. 55092

[21] Appl. No.: 868,956
[22] Filed: Apr. 16, 1992
[51] Int. Cl.⁵ ............................................. A01G 17/06
[52] U.S. Cl. ..................................................... 47/45
[58] Field of Search .................... 47/45, 44, 46, 47, 30, 47/31

[56] References Cited

U.S. PATENT DOCUMENTS

| | | | |
|---|---|---|---|
| 1,053,146 | 2/1913 | Becvar | 47/45 |
| 1,464,801 | 8/1923 | Beers | 47/45 |
| 2,014,175 | 9/1935 | Hart | 47/45 |
| 2,181,016 | 11/1939 | Gross | 47/45 |
| 3,264,783 | 8/1966 | Bayliss | 47/45 |
| 3,299,569 | 1/1967 | Lemrick | 47/45 |
| 4,019,280 | 4/1977 | Summers | 47/45 |
| 4,860,489 | 8/1989 | Bork | 47/45 |
| 4,914,857 | 4/1990 | Dodgen | 47/47 |
| 5,048,231 | 9/1991 | Brown | 47/45 |

Primary Examiner—David A. Scherbel
Assistant Examiner—Michele A. Van Patten
Attorney, Agent, or Firm—Leo Gregory

[57] ABSTRACT

An erection of triangular spaced ground implemented metal rods embodying a plurality of tiers of vertically spaced ring members removably engaging said rods to secure the same in forming a stable structure.

4 Claims, 2 Drawing Sheets

DEMOUNTABLE TOMATO PLANT SUPPORT

BACKGROUND OF THE INVENTION

1. Field of the Invention

This invention relates to a rigid demountable tomato plant support framework.

2. Brief Description of the Prior Art

Tomato plant supports or support devices are in wide common use to support the plant to keep the fruit thereon above ground engagement.

The devices in common use are for the most part makeshift consisting of stakes secured in the ground having a cord strung thereabout.

In another form spaced upright ground secured support rods are used having vertically spaced rings secured thereto as by welding or soldering.

Particularly with the latter indicated supports, there is an off-season storage problem because of the bulkiness of the device.

Thus it is desirable to have an improved easier handled structure for tomato plant support purposes.

SUMMARY OF THE INVENTION

It is an object of the invention herein to provide a tomato plant support device which represents a significant improvement over what has been used in the past.

It is an object herein to provide a readily assembled and demountable tomato plant support framework which in an off-season requires very little storage space.

It is a further object herein to provide as an improvement in the art a demountable framework comprising triangular spaced ground secured upstanding rods or wires having a plurality of vertically spaced rings removably secured thereto.

Said rings as generally to be used increase in diameter from the lowest to the uppermost ring. The upstanding rods are particularly adapted to removably secure said rings thereto at predetermined levels and said rings are readily secured or released without the need of the use of any tools.

These and other objects and advantages of the invention will be set forth in the following description made in connection with the accompanying drawings in which like reference characters refer to similar parts throughout the several views.

BRIEF DESCRIPTION OF THE DRAWINGS

FIG. 5 is a view similar to that of FIG. 4 in front elevation.

DESCRIPTION OF A PREFERRED EMBODIMENT

Figure 1:
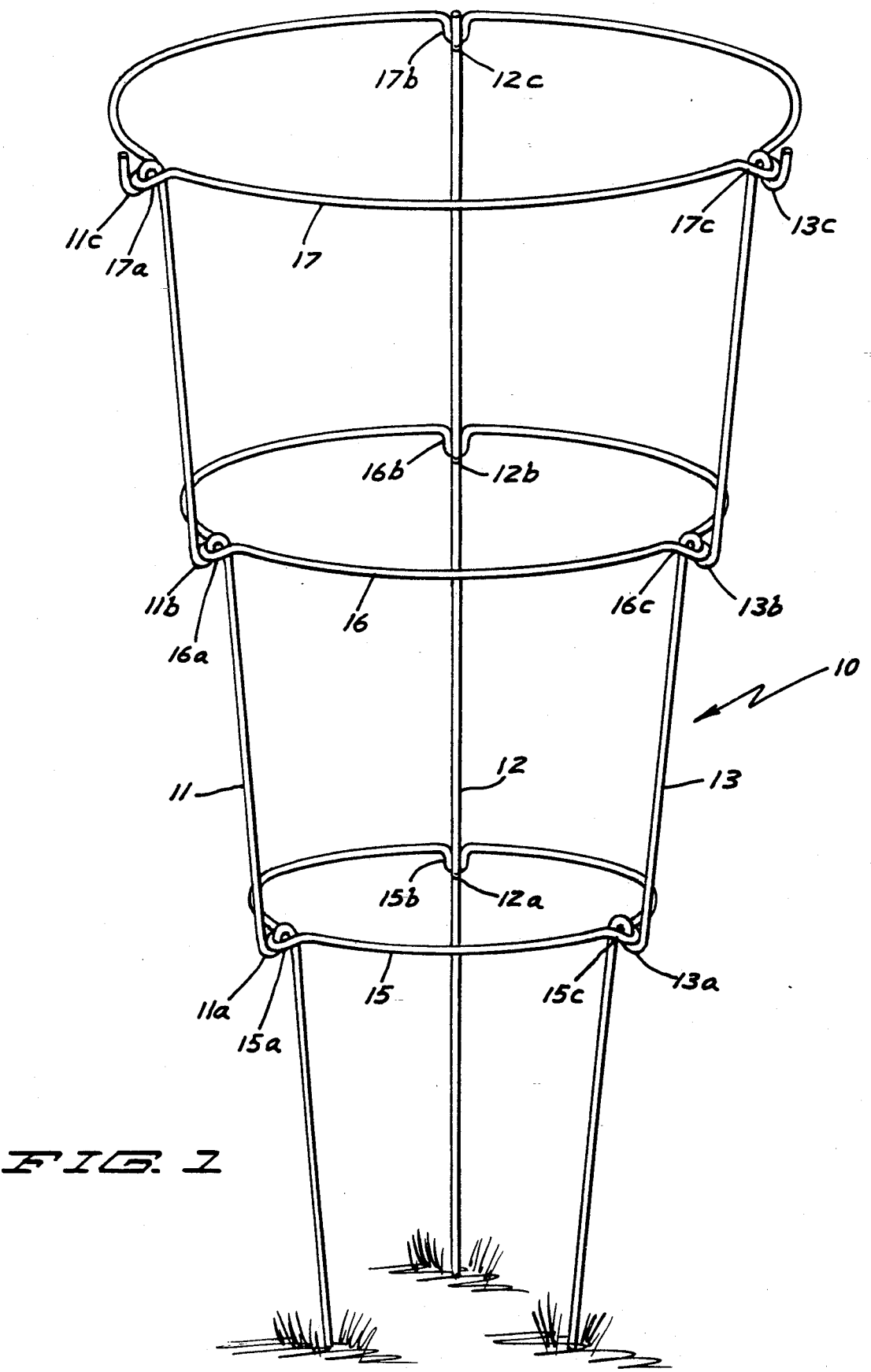
FIG. 1 is a perspective view in front elevation.
Figure 2:
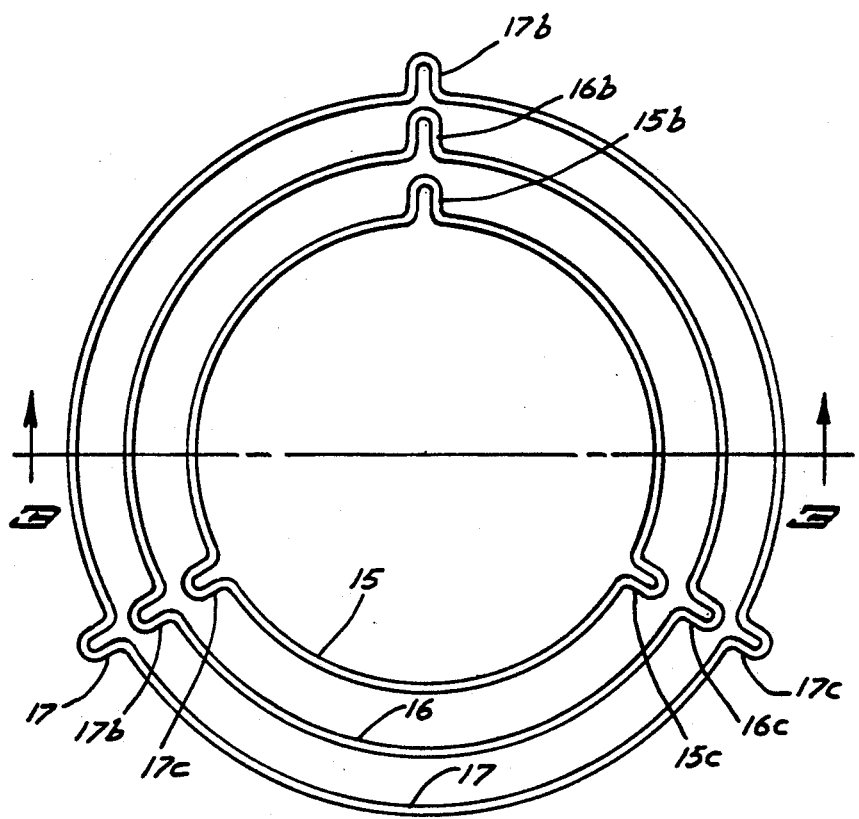
FIG. 2 is a top plan view of ring members.
Figure 3:
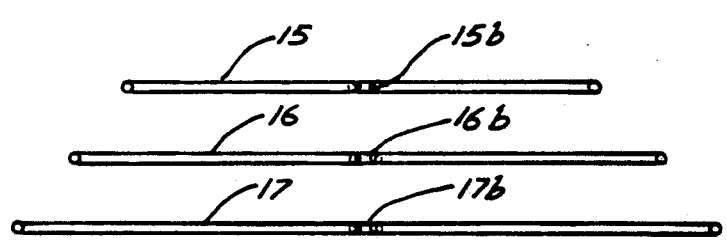
FIG. 3 is a view of ring members in section taken on line 3—3 of FIG. 2 showing the ring members in vertically spaced relation.
Figure 4:
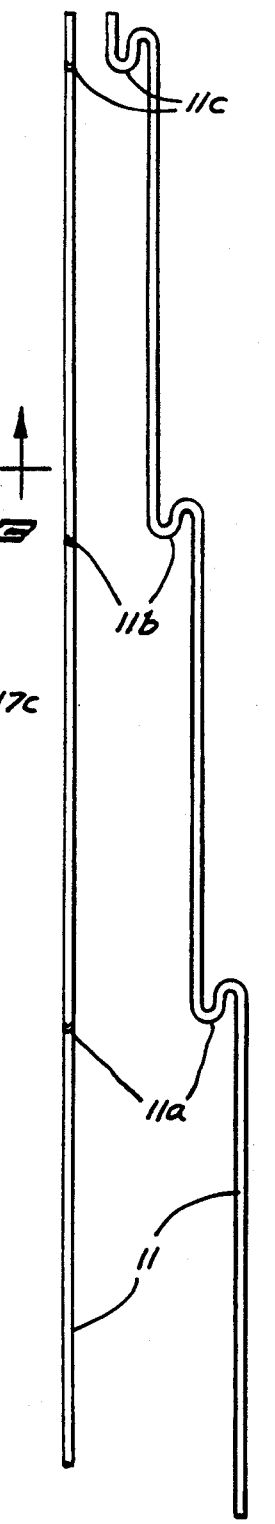
FIG. 4 is a view in side elevation of a rod member.

This invention relates to a demountable tomato plant support structure 10 and with particular reference to FIG. 1, said structure is shown in operating position in a perspective view.

The parts of said structure are readily made from a fairly rigid wire stock such as nine gauge wire which is sufficiently rigid and yet sufficiently flexible to be formed as will be described.

As shown, the support structure herein, comprises, in the embodiment here shown, three vertical rods 11, 12 and 13 which as normally used are sufficiently long to be anchored in the soil by being pressed downwardly thereinto.

Formed in each of the rods and spaced thereon as one-third and two-thirds from the bottom of each rod and at the tops thereof are s-bent or double reverse loops such as at 11a, 11b and 11c on rod 11, these being representative of like loops formed on the other two rods 12 and 13, they respectively having loops 12a, 12b, 12c and 13a, 13b and 13c.

In operating arrangement, said rods are positioned to form a triangle at their base and be upwardly outwardly inclined away from one another in an inverted teepee fashion.

Holding said rods in position in spaced relation are ring members 15, 16 and 17. Formed in said ring members and spaced thereabout on each one are three open loops 15a, 15b and 15c on the ring member 15; loops 16a, 16b and 16c on ring 16 and loops 17a, 17b and 17c on the ring member 17. Said ring members are successfully larger in diameter with ring member 15 being indicated as being the smallest one.

With the rods positioned as indicated, the ring members are disposed thereover and secured thereto. The ring 15 is positioned engaging the lowest loops on said rods as shown in FIG. 1. Also as shown, the ring member loops engage the respective double rod loops and as thus frictionally engaged a rigid structure is formed with said rods. Said loops of said rings are open just sufficiently to assure good frictional interengagement in interlocking with the rod member loops.

In like manner the ring member 16 has its loops 16a–c frictionally engaged with the corresponding loops 11b, 12b and 13b and the largest ring member 17 in like manner is positioned about said rods at the tops thereof having its loops respectively frictionally engage the rod loops 11c, 12c and 13c.

Thus the structure as shown in FIG. 1 is formed. The rods are pushed into the soil about a tomato plant to be well secured and well anchored to be unyielding to wind pressures.

It is to be understood that dimensions as to the length of the rods and diameters of the ring members are relative but for normal usage the rods preferably are on the order of four feet in height and in operating position will be placed to be spaced on the order of seven to ten inches apart at the bottom and flare outwardly upwardly.

It is to be understood that the support may be wider spaced at the bottom and the rods may incline inwardly toward one another. However tomato plants tend to expand as they grow, thus the larger rings are preferably upwardly positioned as shown.

A particular advantage in the tomato support arrangement herein is the fact that it is demountable so that a relative small amount of space is required to carry a substantial inventory in a sales outlet such as a hardware or garden supply store and only minimal space is required for the owner to store the support structure between growing seasons.

It will of course be understood that various changes may be made in form, details, arrangement and proportions of the parts without departing from the scope of the invention herein which, generally stated, consists in an apparatus capable of carrying out the objects above set forth, in the parts and combination of parts disclosed and defined in the appended claims.

What is claimed is:

1. A tomato plant support structure, comprising a plurality of elongated rod members the full height of the support structure, double open ended loops formed in said rod members forming seats spaced therealong, a plurality of ring members, said ring members respectively being of successively increased diameter, spaced open ended loops projecting outwardly respectively formed in the periphery of each of said ring members, said loops on said ring members being equal in number to the number of said rod members, said rod members being positioned to being upright in spaced relation forming an enclosure, and having their respective loops at successive elevations, said ring members being respectively disposed between said upright rod members at each elevation of said loops of said rod members, whereby the respective loops of said ring members and said rod members interengage in a releasable locked engagement.

2. A tomato plant support structure, comprising a plurality of upright rod members positioned to form an enclosure, open ended loops formed on said rods forming seats at successive elevations thereof, a plurality of ring members disposed between said rod members at each elevation of said loops, open ended loops formed said ring members equal in number to the number of said rod members, and said loops of said ring members, seated in said loops of said rods having releasable locked interengagement.

3. The structure of claim 2, wherein said loops on said rods are each formed as vertically disposed open double reversed loops.

4. The structure of claim 2, wherein said upright rod members are three in number and each of said rod members has three open ended double loops formed respectively at the tops thereof and the others being spaced downwardly thereof.

* * * * *